United States Patent

Campbell et al.

Patent Number: 5,786,016
Date of Patent: Jul. 28, 1998

[54] PROCESS AND DEVICE FOR SHAPING BAKER'S DOUGH PIECES

[75] Inventors: Glenn P. Campbell; Sterrett P. Campbell, both of Atlanta, Ga.

[73] Assignee: Campbell Technologies, Inc., Norcross, Ga.

[21] Appl. No.: 853,537

[22] Filed: May 9, 1997

[51] Int. Cl.⁶ .................. A21C 11/00; A21D 8/00
[52] U.S. Cl. .................. 426/496; 425/332; 425/333; 425/364 R; 426/512
[58] Field of Search .................. 426/496, 512; 425/332, 333, 364 R

[56] References Cited

U.S. PATENT DOCUMENTS

| 4,008,025 | 2/1977 | Campbell | 425/332 |
| 4,306,850 | 12/1981 | Cummins | 425/332 |
| 4,668,524 | 5/1987 | Kirkpatrick | 425/364 R |
| 5,270,070 | 12/1993 | Campbell | 426/503 |
| 5,283,074 | 2/1994 | Campbell | 426/496 |
| 5,605,708 | 2/1997 | Cummins et al. | 425/364 R |

*Primary Examiner*—George Yeung
*Attorney, Agent, or Firm*—Thomas, Kayden, Horstemeyer & Risley

[57] ABSTRACT

Dough shaping devices for shaping baker's dough pieces include a pair of cooperating shaping members, such as concave rounder bars (27) placed over a surface conveyor (16). The concave surface of the rounder bars is formed with a metal base plate (45) that includes a concave dough shaping surface (46) formed of stainless steel. Metal particles are formed on the dough shaping surface by the sputtering of metal plasma, to form a roughened texture, and a slick material, such as a fluropolymer, is applied thereover, to form a grainy but slick surface against which the dough pieces move. The grainy surface retards sliding friction of the dough pieces, while the slick surface permits immediate release of the dough from the dough shaping surface.

9 Claims, 3 Drawing Sheets

PROCESS AND DEVICE FOR SHAPING BAKER'S DOUGH PIECES

FIELD OF THE INVENTION

This invention relates to the handling of baker's dough in a bread making process. More particularly, the invention relates to devices for the forming of individual dough pieces as the dough pieces move in sequence along a dough processing path, to shape the dough pieces into the desired form for subsequent handling.

BACKGROUND OF THE INVENTION

In the handling of baker's dough in a high speed dough processing line as the dough is processed from the dough pump and dough divider toward the baking ovens, it is necessary to develop the skin of the dough pieces and to form the dough into the correct shape for delivery to the baking pans, etc. For example, after the dough has been divided from a mass of dough into parallel columns of dough pieces, the dough pieces are carried in columns of dough pieces by a surface conveyor through a rounder bar assembly, where the dough pieces are rolled against the rounder bars and formed into dough balls, with the exterior surface of the dough balls becoming more developed during this process. This rolling function of the dough pieces is caused by the dough pieces being carried by the surface conveyor and rounder bars being suspended at an angle across the surface conveyor in alignment with each column of dough pieces so that the dough pieces engage the stationary concave shaping surfaces of the rounder bars. This engagement slightly retards the movement of the dough pieces as the surface conveyor runs beneath the rounder bars, resulting in the rolling motion of the dough pieces. During this rolling motion of the dough pieces, the surface of the dough pieces engage the conveyor and the rounder bars and become rounded into balls and a skin is developed and formed on the dough balls, so that the dough balls can be transferred to subsequent processing stations with reduced likelihood of clinging to the subsequent equipment. Examples of prior art rounder bars are disclosed in U.S. Pat. Nos. 4,008,025 and 4,306,850. Examples of dough pumps and dough dividers which continually feed columns of dough pieces to rounder bars are disclosed in U.S. Pat. Nos. 5,283,074 and 5,270,070.

Other dough handling and shaping equipment which typically is in a baker's dough processing path between the dough divider and the baking ovens are the moulder boards and sheeter-rollers. The moulder boards are placed over a surface conveyor system, and the dough balls are required to pass through the small spaces between the surface conveyor and the moulder boards. This tends to flatten out the dough pieces as they move farther along the processing path.

The sheeter-rollers typically comprise a pair of parallel cylindrical rolls that receive dough pieces between them and rotate toward each other to squeeze the generally spherical dough balls into sheets which are delivered to a dough pan, etc.

The above described examples of handling dough pieces in a bread making process all rely upon the dough pieces coming in contact with a shaping member that temporarily engages and retards the movement of the surfaces of the dough pieces that it contacts, so that the remaining portion of the dough pieces continues its movement under the influence of an opposing second shaping member, such as a conveyor belt. The conveyor belt movement urges the dough pieces to continue their movements along the processing path, but the engagement by the dough pieces against the shaping member requires the dough pieces to turn or twist or become compressed into a desired shape, while in the meantime the skin of the dough pieces becomes more developed.

In the past, the surfaces of the dough shaping members, such as the concave dough-engaging surfaces of rounder bars, or the flat dough engaging surfaces of the moulder boards, or the facing cylindrical surfaces of the sheeter-rollers, have been fabricated of material having a smooth exterior surface for engaging the dough pieces, such as stainless steel with a smooth surface, shaped nylon, or a surface that has been coated with a copolymer, such as Teflon. It is important that the dough pieces do not leave a residue of dough on the shaping devices, and that the dough pieces do not cling to the shaping devices so that the following dough pieces can pass through the equipment unimpaired. While the above noted smooth surfaces perform better than other known baker's dough engagement surfaces in a dough handling system, there are problems with the use of these materials in dough shaping devices.

For example, if the concave dough engaging surface of a rounder bar structure is too slippery, the dough balls tend to slide on its surface, so that the desired turning function of the dough pieces is not fully achieved. If the concave dough engaging surfaces of the rounder bars are made less slick, so as to have a somewhat roughened texture to enhance the rolling function of the dough pieces, the dough pieces tend to more readily cling to the rounder bar surfaces, so that the alignment of the fast moving rows of multiple column dough pieces through the system become askew, which tends to disrupt the following functions of the multiple column processing system. Similar problems are encountered when the surface conveyor moves the dough pieces beneath the moulder boards which tend to flatten the dough pieces. If the dough engaging surfaces of the moulder boards are too slippery, the dough will slide against their surfaces and the moulding of the dough is not performed as desired, but if the surface texture of the moulder boards is roughened somewhat to avoid the sliding of the dough against their surfaces, the dough pieces tend to more readily cling to the moulder boards.

With regard to the sheeter-rollers, similar problems are encountered, in that the rougher the surfaces of the sheeter-rollers, the more likelihood there is to be a clinging of the dough to the sheeter-rollers.

Thus, it can be seen that it would be desirable to provide dough shaping equipment usable in the processing and handling of baker's dough that tends to retard the sliding movement of the baker's dough when the dough engages the equipment, but which functions to readily release the dough when the dough is moved away from the equipment.

SUMMARY OF THE INVENTION

Briefly described, the present invention comprises dough shaping devices for shaping baker's dough pieces as the dough pieces are moved in series along a processing path. The shaping devices include first and second shaping members which are spaced from each other a distance suitable for engaging opposing surfaces of the fast moving dough pieces. The dough pieces move between the shaping members and are flattened or rounded or otherwise shaped as they pass between the shaping members. At least one of the dough shaping members is treated so as to be formed with a roughened textured surface with a slick material coating the roughened texture surface to a thickness that is thin enough to cause the roughened textured surface to form an array of closely spaced protrusions or nodules on the surface of the shaping member. The roughened surface retards the sliding of the dough pieces against the surface of the shaping member and the slick material permits the dough pieces to release from the shaping member.

In one embodiment of the invention, the concave dough engaging surfaces of a set of rounder bars is treated as described above. The surface conveyor that passes beneath the rounder bars moves the dough pieces into engagement with the roughened textured but slick surfaces of the rounder bars. The treated surface retards the tendency of the dough pieces to slide along the surface of the rounder bars, which results in the dough pieces being turned or rolled over in a circular pattern on the surface conveyor as the surface conveyor continues to move beneath the rounder bars. In the meantime, the slick surface of the coating avoids having the dough of the dough pieces cling to the rounder bars.

In another embodiment of the invention, moulder boards have their dough engaging surfaces which face the surface conveyor treated as described above, with substantially similar results.

Further, a pair of parallel, closely spaced sheeter rollers have their cylindrical surfaces treated as described above, so that when dough pieces are delivered to the nip of the sheeter rollers, the roughened surfaces of the rollers tends to draw the dough pieces into the nip of the rollers substantially without any sliding between the dough pieces and the rollers, and when the dough pieces move to the other side of the nip, the slick surface of the rollers permits the dough pieces to disengage from the rollers without clinging.

In the embodiments disclosed herein, the dough shaping devices are formed with a substantially rigid base member formed of stainless steel, and with a layer of stainless steel plasma applied thereto by sputtering. This forms a very rough coating on the surface of the stainless steel base member. Once the sputtered plasma has been cured on the stainless steel base member, a coating of a fluropolymer, such as Teflon, is applied to the base member to a thickness that covers the sputtered plasma, but which is thin enough to permit the sputtered plasma to form protrusions or nodules in the surface of the coating after the coating has been cured. This creates a substantially grainy texture to the dough shaping device, but the grainy texture is very slick because of the application of the fluropolymer.

Thus, it is an object of this invention to provide improved dough shaping devices for shaping baker's dough pieces as the dough pieces are moved in series along a dough processing path from a dough divider toward a baking oven.

Another object of this invention is to provide an improved rounder bar assembly for shaping and developing the skin of baker's dough pieces as the dough pieces are moved in series along a processing path, using a slick but roughened surface of the rounder bars to engage and turn the dough pieces while retarding the tendency of the dough pieces to cling to the rounder bars.

Other objects, features and advantages of the present invention will become apparent upon reading the following specification, when taken in conjunction with the accompanying drawings.

DETAILED DESCRIPTION

Figure 1:
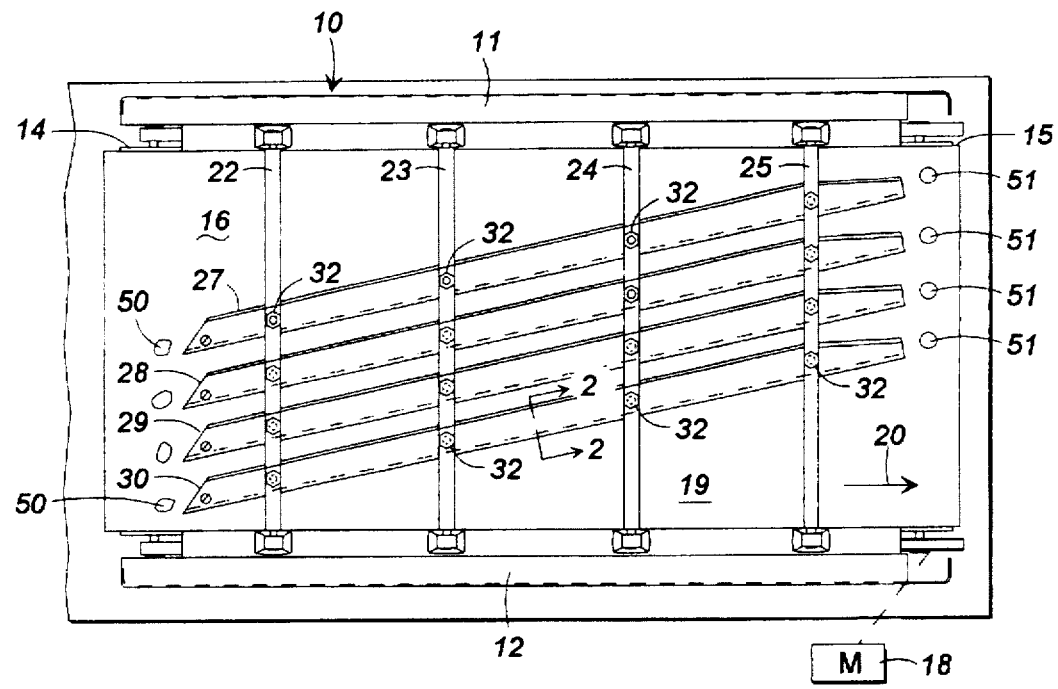
FIG. 1 is a plan view of a rounder bar assembly of a baker's dough processing system, showing the rounder bars disposed at an angle over a surface conveyor.

Referring now in more detail to the drawings, in which like numerals indicate like parts throughout the several views, FIG. 1 illustrates the first of the shaping devices disclosed herein, which comprises a rounder bar assembly 10 that includes side frame elements 11 and 12, conveyor rollers 14 and 15 rotatably supported at the ends of the frame elements 11 and 12, and an endless conveyor belt 16 stretched about the rollers 14 and 15.

A motor 18 is schematically illustrated in driving relationship with respect to one of the conveyor rollers 15, which comprises a means for continuously moving the upper flight 19 of the conveyor belt 16 along a processing path 20.

Rounder bar support arms 22, 23, 24 and 25 are supported at their ends by side frame elements 11 and 12 and are suspended over the surface conveyor. Rounder bars 27, 28, 29 and 30 are each mounted to and suspended from the rounder bar support arms 22-25, over the moving conveyor belt 16 of the surface conveyor.

Figure 2:
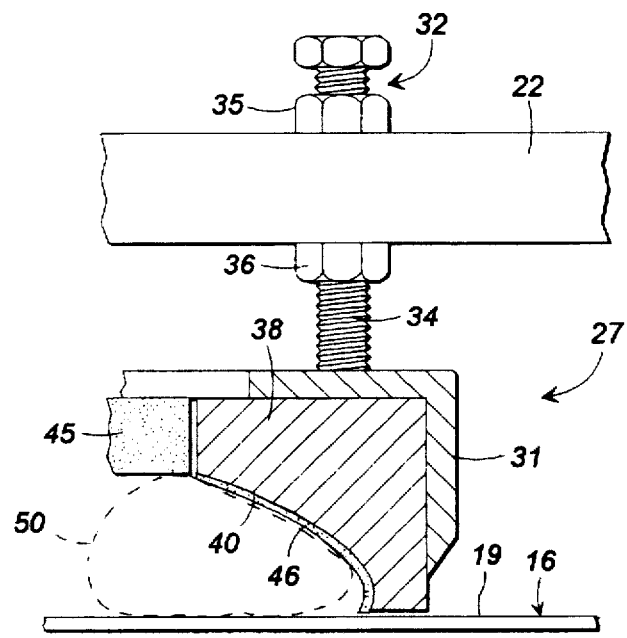
FIG. 2 is an end cross-sectional view of one of the rounder bars of FIG. 1, taken along lines 2—2 of FIG. 1.

As shown in FIG. 2, each rounder bar, such as rounder bar 27, comprises an angled support beam 31 supported from the rounder bar support arms 22-25 by adjustable screw supports 32. Each adjustable screw support includes a threaded screw 34 that extends downwardly through an opening (not shown) in its rounder bar support arm 22-25, and attached at its lower end by welding or other conventional means to angle support beam 31. Threaded nuts 35 and 36 are positioned on the screw 34, on opposite sides of rounder bar support arm 22, so as to firmly hold the rounder bars in position above the moving conveyor belt 16. Insert 38 is mounted to the inside angled surfaces of the angle support beam 31. Insert 38 includes a downwardly sloped concave side surface 40 which is generally juxtaposed and parallel to the surface of the conveyor belt 16.

Figure 3:
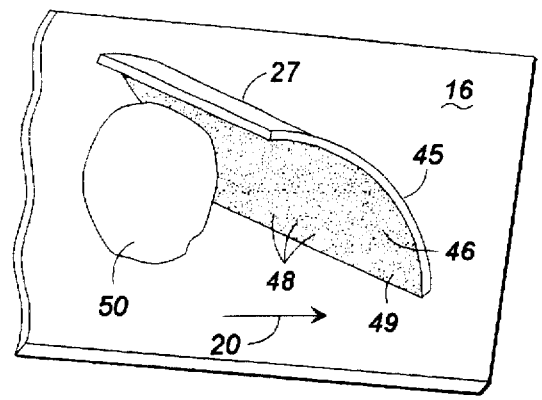
FIG. 3 is a schematic representation of a single rounder bar and its surface conveyor, showing a dough piece as it travels with the surface conveyor and engages the rounder bar.

A metal base plate 45 is mounted to insert 38 by an adhesive coating or by other conventional attachment means, with the metal base plate 45 formed in a shape that is compatible with the sloped side surface 40 of the insert 38, so that the insert supports the metal base plate. The metal base plate 45 has its own downwardly sloped dough piece engaging side surface 46 which conforms to the shape of the concave surface 40 of the insert 38. Typically, the insert 38 is formed of shaped nylon. The metal base plate 45 includes a surface treatment so as to be formed with a roughened textured surface, and a slick material covering the roughened texture surface to a thickness that is thin enough to cause the roughened textured surface to form protrusions in the coating. As shown in the embodiment of FIG. 3, the metal base plate 45 is formed of stainless steel, and its sloped side surface 46 has applied thereto a sputtered plasma metal, such as stainless steel, with particles 48 of the sputtered metal being substantially uniformly distributed over the concave surface 46. A fluropolymer 49, such as Teflon, is applied, as by spraying, to the concave surface 46, covering the particles 48 and any exposed surfaces of the concave surface 46. The fluropolymer is sprayed so as to form a coating having a thickness that is thin enough to cause the sputtered metal particles to form a roughened surface in the coating. Because of the slickness of the exposed surface of the fluropolymer, the dough pieces, such as the dough piece 50 of FIGS. 2 and 3, can easily release from the concave surface 46 of the rounder bar when the dough piece moves away from the surface of the rounder bar. However, the grainy treated surface 46 of the rounder bar is resistant to sliding movement of the dough pieces. Typically, the grainy surface will retard any sliding motion of the dough pieces 50 as the conveyor belt 16 moves along the processing path 20.

As the conveyor belt 16 moves along the processing path, the dough pieces 50 that are dropped onto the conveyor belt adjacent the rounder bars 27–30 will be moved in columns 51 and sequentially into engagement with the treated concave sloped surfaces 46 of the rounder bars. Since the rounder bars are angled across the processing path 20, the dough pieces will engage the sloped surfaces 46 of the rounder bars and the grainy textured surface of the rounder bars will retard any sliding movement of the dough pieces 50 with respect to the rounder bars. This causes the dough pieces to be accurately rolled with respect to opposing working surfaces of the conveyor belt 16 and the rounder bars 27–30, thereby developing a skin on the dough pieces and forming the dough pieces into the desired ball shapes. Further, as the surfaces of the dough pieces 50 roll away from contact with the treated grainy surface 48 of the rounder bars, the slick surface of the fluropolymer allows the dough pieces to release from the rounder bars, so that there is substantially no tendency for the dough pieces to cling to or leave a residue on the treated surface 46.

Figure 4:
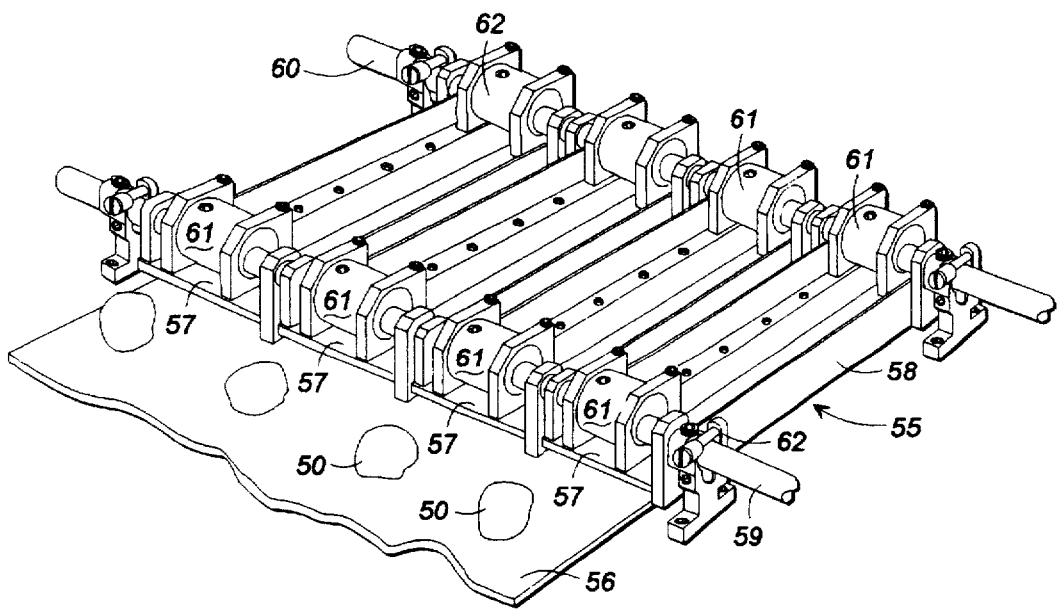
FIG. 4 is a perspective view of a moulder board assembly.

As illustrated in FIG. 4, a moulder board assembly 55 is placed over a surface conveyor belt 56 for the purpose of flattening the dough pieces 50. The moulder board assembly 55 includes a plurality of side-by-side parallel moulder boards 57, with each moulder board being suspended over and opposing the surface conveyor belt 56 by means of side frame elements 58, cam shafts 59 and 60, cams 61, and cam followers 62 which are mounted between the cams 61 and the moulder boards 57. When the cam shafts 59 and 60 are rotated by an electric motor (not shown), the moulder boards 57 oscillate toward and away from the surface conveyor 56, and as the dough balls 50 move between the moulder boards 57 and the surface conveyor belt 56, the dough balls become flattened in an elongated shape.

Figure 5:
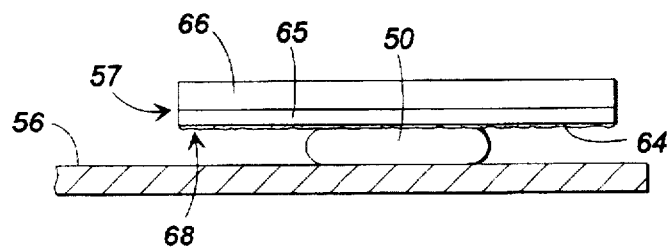
FIG. 5 is an end view of a moulder board and the conveyor belt.

As illustrated in FIG. 5, each moulder board 57 includes a stainless steel base plate 65 that is attached to a support sheet 66 by adhesives or other conventional connection means. As previously described, the downwardly facing surface 68 of the metal base plate 65 is a treated surface, having sputtered plasma stainless steel particles adhered to the surface 68 and a fluropolymer coating applied to the base plate over the sputtered metal particles to a thickness that is thin enough to leave a rough or grainy surface on the downwardly facing shaping surface of the moulder board.

As described in connection with the rounder bars of FIGS. 1–3, the treated surface 68 of the moulder boards 57 resist sliding movement of the dough pieces against the moulder boards while readily releasing the dough pieces as they are rolled by the opposed facing working surface of the surface conveyor 56, so that there is substantially no tendency of the dough pieces to cling to or leave a residue of dough on the treated surface 68 of the moulder boards.

Figure 6:
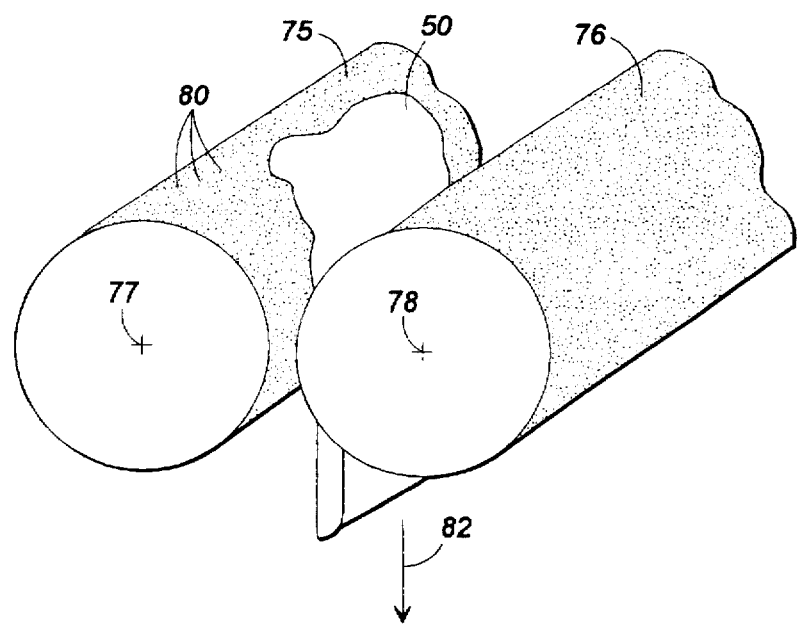
FIG. 6 is a partial perspective view of a pair of sheeter-rollers.

As illustrated in FIG. 6, the elongated sheeter rollers 75 and 76 are cylindrical, are placed in parallel, spaced side-by-side relationship and are rotatable about their axes 77 and 78, with the upper surfaces of the sheeter rollers moving downwardly and between the sheeter-rollers. The rollers are rotated by an electric motor (not shown).

Preferably, the sheeter-rollers are constructed of stainless steel, each having a smooth stainless steel surface. As with the rounder bars and moulder boards, the cylindrical surfaces of the sheeter rollers are treated, with sputtered plasma metal adhered to the cylindrical surfaces of the rollers, and with a fluropolymer coating applied over the sputtered plasma metal. The sputtered metal particles 80 are substantially uniformly distributed on the surfaces of the rollers, and the slick coating of fluropolymer is applied to a thickness that is thin enough to permit the sputtered metal particles to form protrusions in the coating, resulting in a grainy surface on the sheeter rollers.

As previously described, the grainy but slick cylindrical surface of the sheeter rollers tends to avoid sliding movement of the dough pieces 50 as the dough pieces are deposited on the upper converging surfaces of the sheeter rollers, so that the dough pieces 50 are immediately urged downwardly between the sheeter rollers as indicated by direction arrow 82, with no sliding being encountered between the dough pieces and the surfaces of the sheeter-rollers. However, when the surfaces of the sheeter rollers 75 and 76 begin to move away from the dough pieces 50, the slick surface formed by the fluropolymer coating tends to avoid any clinging of the dough to the sheeter-rollers.

While the foregoing description and drawings illustrate preferred embodiments of the invention, it will be understood that variations and modifications thereof can be made without departing from the spirit and scope of the invention, as described in the following claims.

We claim:

1. A dough shaping device for shaping baker's dough pieces as the dough pieces are moved in series along a dough processing path comprising:

a dough moving means for urging the dough pieces to move along the dough processing path;

a shaping member having a dough shaping surface juxtaposed said dough moving means for sequentially engaging the dough pieces as the dough pieces move in series along the processing path and for changing the shapes of the dough pieces;

said dough shaping surface formed with a roughened textured surface and a slick fluropolymer coating covering said roughened textured surface so that when the dough pieces engage the shaping surface sliding motion between the dough pieces and the shaping surface is retarded, and when the dough pieces move away from the shaping surface the dough pieces tend to release from the shaping surface; and means for continuously driving said dough moving means with respect to said shaping member as the dough pieces move adjacent said dough shaping surface.

2. The dough shaping device of claim 1, and wherein said dough moving means comprises a surface conveyor and said shaping member comprises a rounder bar with a dough shaping surface formed with said roughened textured surface and a fluropolymer coating covering said roughened textured surface for engaging the dough pieces juxtaposed said surface conveyor, and said means for continuously driving said dough moving means comprises motor means for driving said surface conveyor.

3. The dough shaping device of claim 1, and wherein said shaping member and said dough moving means comprise a pair of elongated sheeter-rollers spaced side-by-side and parallel to each other, wherein both of said sheeter-rollers include surfaces formed with said roughened textured surface and a fluropolymer coating covering said roughened textured surface for engaging the dough pieces, and said means for continuously driving said dough moving means comprises means for rotating both of said sheeter-rollers.

4. The dough shaping device of claim 1, and wherein said shaping member comprises a moulder board having a dough shaping surface formed with said roughened textured surface and a fluropolymer coating covering said roughened textured surface for engaging the dough pieces, and said dough moving means comprises a surface conveyor juxtaposed said shaping surface.

5. The dough shaping device of claim 1, and wherein said shaping surface comprises a metal base, sputtered plasma metal particles adhered to and spaced uniformly about said metal base, and a fluropolymer coating applied to said metal base and covering said sputtered metal particles to a thickness that is thin enough to cause the sputtered metal particles to form a grainy shaping surface.

6. A process of shaping dough pieces as the dough pieces are moved in series along a processing path, comprising:

moving the dough pieces along the processing path with a first member; as the dough pieces are moved by the first member, engaging the dough pieces with a dough shaping surface, with the dough shaping surface characterized by having a roughened textured surface and a slick fluropolymer coating covering said roughened textured surface to a thickness that is thin enough to leave a roughened textured surface on the dough shaping surface;

retarding sliding movement of the dough pieces along the dough shaping surface with the roughened textured surface; and releasing the dough pieces with the slick fluropolymer coating as the dough pieces move away from the dough shaping surface.

7. The process of claim 6, and wherein the dough shaping surface is formed by a metal base, sputtered plasma metal particles adhered to the base, and a fluropolymer coating applied to the base and to the sputtered metal particles to a thickness that is thin enough to cause the sputtered metal particles to form a roughened surface in the coating, and the step of retarding the movement of the dough pieces along the dough shaping surface comprises engaging the dough with the roughened surface, and the step of releasing the dough pieces comprises releasing the dough pieces with the fluropolymer coating.

8. A rounder bar for use with a surface conveyor of a baker's dough processing system for engaging dough pieces transported by the surface conveyor, comprising:

a body having a concave working surface forming a dough engaging surface for cooperation with the conveyor to define an elongated pocket for engagement by dough pieces being transported by the surface conveyor.

said concave working surface including a stainless steel base, a layer of sputtered plasma stainless steel particles applied to said base, and said base and said particles coated with a fluropolymer to a thickness thin enough for the particles to form a roughened surface on said concave working surface.

9. A dough shaping device for shaping baker's dough pieces as the dough pieces are moved along a dough processing path comprising:

a dough moving means for urging the dough pieces to move along the dough processing path;

a shaping member having a dough shaping surface juxtaposed said dough moving means for engaging the dough pieces as the dough pieces move along the processing path and for changing the shapes of the dough pieces;

said dough shaping surface having a roughened textured surface and a fluropolymer coating covering said roughened textured surface to a thickness that is thin enough so that the roughened textured surface of the shaping surface forms a roughened textured surface in the coating, so that when the dough pieces engage the shaping surface sliding motion between the dough pieces and the shaping surface is retarded by the roughened textured surface of the coating, and when the dough pieces move away from the shaping surface the dough pieces tend to release from the coating; and means for driving said dough moving means and said shaping member with respect to each other as the dough pieces move adjacent said dough shaping surface.

\* \* \* \* \*